(12) United States Patent
Stork et al.

(10) Patent No.: US 6,966,868 B2
(45) Date of Patent: Nov. 22, 2005

(54) METHOD FOR ADAPTING THE ADJUSTMENT OF A CLUTCH IN AN UNCONVENTIONAL DRIVE TRAIN OF A VEHICLE

(75) Inventors: Holger Stork, Buehl (DE); Gunter Hirt, Kongsberg (NL); Martin Brandt, Thalmassing (DE); Andreas Deimel, Ingolstadt (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 1 day.

(21) Appl. No.: 10/754,816

(22) Filed: Jan. 9, 2004

(65) Prior Publication Data

US 2004/0157704 A1 Aug. 12, 2004

Related U.S. Application Data

(63) Continuation of application No. PCT/DE02/02349, filed on Jun. 27, 2002.

(30) Foreign Application Priority Data

Jul. 12, 2001 (DE) .............................. 101 34 007

(51) Int. Cl.$^7$ ............................................. B60K 41/02
(52) U.S. Cl. ...................................................... 477/74
(58) Field of Search ............................... 477/174, 167, 477/181, 166, 83, 84, 86, 6, 5

(56) References Cited

U.S. PATENT DOCUMENTS 5,337,868 A * 8/1994 Liu et al. ...................... 477/74
5,393,274 A * 2/1995 Smedley ....................... 477/74
5,681,242 A * 10/1997 Bates .......................... 477/180

* cited by examiner

Primary Examiner—Dirk Wright
(74) Attorney, Agent, or Firm—Davidson, Davidson & Kappel, LLC

(57) ABSTRACT

Methods are provided for adapting clutches for use in unconventional drive trains, for example those used in hybrid vehicles having a electric motor/generator.

30 Claims, 2 Drawing Sheets

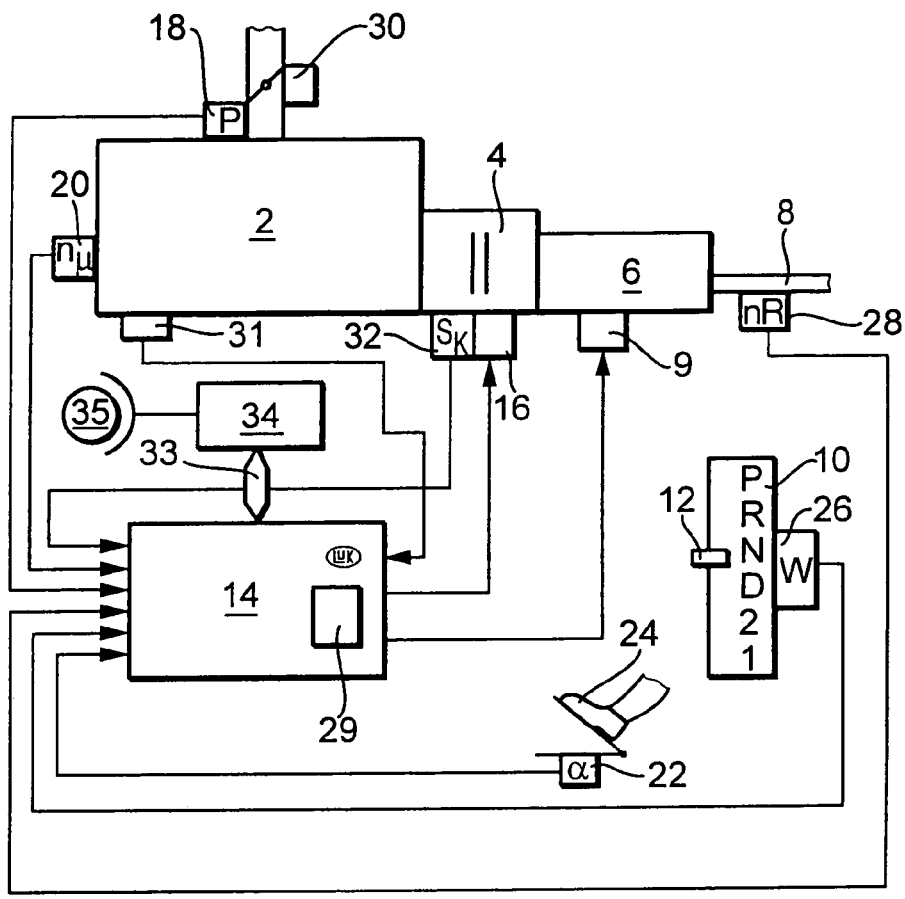
Prior Art  Fig. 5
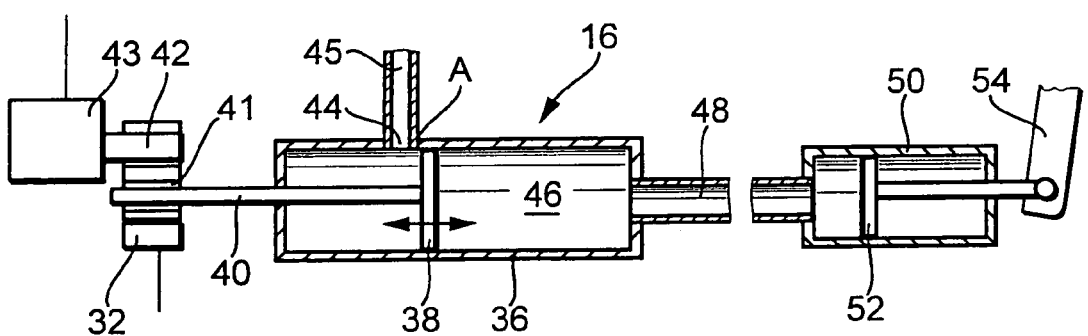
Prior Art  Fig. 6

METHOD FOR ADAPTING THE ADJUSTMENT OF A CLUTCH IN AN UNCONVENTIONAL DRIVE TRAIN OF A VEHICLE

CROSS-REFERENCE TO RELATED APPLICATIONS

This is a continuation of International Application No. PCT/DE02/02349, filed Jun. 27, 2002, and claims priority to German Patent Application No. 101 34 007.9, filed Jul. 12, 2001, both applications hereby being incorporated by reference herein.

BACKGROUND INFORMATION

The present invention relates to a method for adapting the adjustment of a clutch in an unconventional drive train of a vehicle.

Automatic clutches are increasingly used not only due to the enhanced comfort they provide but also because of the possible fuel economy in motor vehicles.

FIG. 5 shows an exemplary block diagram of a drive train of a motor vehicle equipped with an automated clutch. The drive train contains an internal combustion engine 2, a clutch 4, and a transmission 6, which is connected to the driving wheels via a drive shaft 8. Transmission 6 is an automated manual transmission, for example, or a V pulley transmission having a continuously variable reduction ratio. An actuating device 9, which is controllable in a known manner by a selector device 10 having a selector lever 12 via a control unit 14, is used for actuating or shifting transmission 6. Of course, the selector device may also have a different design, for example, as a conventional shift stick or a lever with up- and downshift positions. Clutch 4 is, for example, a friction disk clutch of an essentially known design, having an actuating device 16, which may be of a hydraulic, electrical, electrohydraulic, or other known design.

The sensors contained in the drive train such as a pressure sensor 18 for detecting the intake pressure of engine 2, a rotational speed sensor 20 for detecting rotational speed $n_M$ of the engine crankshaft, a sensor 22 for detecting position a of an accelerator pedal 24, a sensor 26 for detecting the position of selector lever 12, and another rotational speed sensor 28 for detecting the speed of drive shaft 2 are connected to the inputs of control unit 14.

Characteristic maps and programs for controlling actuators such as a load adjusting element 30 for adjusting the load on engine 2, actuating device 16 of clutch 4, and shifting device 9 of transmission 6, as well as other consumers 31 directly or indirectly driven by the engine such as a generator, a pump, or a heating element, etc. are stored in control unit 14, which contains a microprocessor and respective memories 29 in a known manner. The individual actuators may be designed in such a way that their positions are directly communicated to control unit 14, for example, as stepping motors, or other position sensors such as position sensor 32 for detecting a parameter that is relevant to position $s_K$ of the clutch, may be provided.

Another control unit 34, which controls vehicle brakes 35, for example, as known from antilock systems or driving stability systems, is connected to control unit 14 via data bus 33. The hardware and software distribution between units 14 and 34 is adapted to the particular conditions.

The design and function of the above-described device are essentially known and are therefore not explained here in detail. Load adjusting element 30, actuating device 16, and shifting device 9 are actuated in a mutually synchronized manner according to a driving intent communicated via accelerator pedal 24 and the driving program request communicated via selector lever 12 as a function of the signals delivered by the sensors, so that smooth and/or fuel-saving driving results.

A characteristic curve, which determines, as a function of the torque to be transmitted by clutch 4, a setpoint position of clutch 4, set by actuating device 16 for actuating clutch 4, is stored in a memory of control unit 14, for example. For reasons of control quality, clutch wear, and power consumption by actuating device, the clutch torque to be transmitted should not exceed the absolutely necessary value. The necessary torque to be transmitted is obtained from the driver's intent, i.e., the position of accelerator pedal 24 and, for example, from the load on engine 2 detected by sensor 18, as well as additional operating parameters such as the speed of engine 2, etc.

The characteristic curve stored in control unit 14, which provides the setpoint path of an adjusting element moved by actuating device 16 as a function of the calculated torque to be transmitted has a decisive influence on a smooth start and a smooth shifting process. The characteristic curve changes short-term, for example, due to temperature changes, and long-term over the lifetime of the clutch due to wear, for example. Therefore it is continuously updated, i.e., adjusted according to different strategies in the presence of certain operating conditions.

FIG. 6 shows in detail an example of an actuating device 16 having a hydraulic connector.

A piston 38, whose shaft 40 has external teeth meshing with the internal teeth of a gear 41, which in turn engages with the external teeth of a pinion 42 of a small electric motor which is activated by control unit 14 (FIG. 5), moves in a sensor cylinder 36 filled with hydraulic fluid. The motor may be of any suitable design and is activated using a PWM (pulse width modulation) signal, for example. The motor is advantageously a stepping motor. Transducer cylinder 36 has vent hole 44, which is connected to an equalizing container via a line 45. A line 48 connects pressure chamber 46 of the cylinder to a slave cylinder 50, in which a piston 52 moves, which is connected, by its shaft, to a disengaging lever 54 of the clutch, forming an adjusting element, for example. Position A, which is referred to in general as a venting position, is the position which, when piston 38 passes beyond vent hole 44 in FIG. 6 to the right and pressure is built up in pressure chamber 46 for actuating (i.e. opening) the clutch.

An incremental position sensor 32, for example, of a known design, which counts the teeth of gear 41 moving past it and delivers the corresponding pulses to control unit 14, is provided for position sensing. The number of these pulses is a direct measure of the displacement of sensor piston 38 and, when sensor piston 38, as shown in FIG. 6, is to the right of venting position A, of movement of disengaging lever 54.

In a venting sequence, sensor piston 38, preferably having a check valve integrated in it, which opens in the event of overpressure on the left side of piston 38, moves to the left beyond venting position A, in such a way that the hydraulic link between pistons 38 and 52 is connected to line 45 and is depressurized. In this depressurized state of the hydraulic link, disengaging lever 54 assumes its fully closed position, i.e. the engaged position of the clutch. If sensor cylinder 38 is then moved by motor 42 to the right, disengaging lever 54 is actuated at the time when sensor piston 38 moves over venting position A. This position of sensor piston 38 may be detected in various ways, the count of position sensor 32 being stored in control unit 14 as the closed position.

In addition to the closed position of the clutch, it is important to know the gripping or contact point of the clutch, also known as the biting point, i.e., the position in which the clutch transmits a predefined small torque, of 4 Nm for example. Knowing the gripping point exactly is important because it plays an important role in start and shifting. When the clutch disengages beyond the gripping point, it is completely disengaged. If the clutch is not actuated up to the gripping point, gear shifting is impossible without considerable impairment in comfort or even risk of damage to the transmission, and the vehicle creeps considerably.

The gripping or contact point is normally set by disengaging the clutch completely in certain operating states of the drive train, for example, with the vehicle stopped, the brake actuated and transmission in gear, and then engaging it slowly, while the engine torque is measured. If the engine torque, which is easily obtained in an engine equipped with idling regulation, for example, via an adjusting element of the idling regulator, reaches the predefined value while the clutch is being slowly engaged, position sensor 32 is read and its value is stored as the gripping point of the clutch. The gripping point may thus be quickly reached and used as the orientation value for performing a start sequence or a shifting sequence. A gripping or contact point adaptation takes approximately five seconds and is typically performed once per trip.

Similarly, individual points of the path/torque characteristic curve of the clutch, stored in the control unit, may be updated or adapted by determining the clutch torque, reading the corresponding position of the actuating device or position sensor 32, and storing it as the updated or adapted new position. The clutch will slip when engaged at a relatively high clutch torque, the clutch torque being determined by determining the torque of the engine, taking into consideration its speed change and moment of inertia. The clutch characteristic curve, which changes due to changes in the coefficient of friction of the clutch, may then be adapted in this way.

In venting, the sensor cylinder briefly returns to its venting position as explained above. The clutch is completely engaged. A venting sequence takes approximately 400 ms and may take place with an interval of a few minutes.

BRIEF SUMMARY OF THE INVENTION

The need to reduce fuel consumption has resulted in novel vehicle drive trains and control concepts in which the engine is shut off automatically in certain operating states or an electric motor/generator is used either for starting the engine, for accelerative force by itself, or for accelerative force in addition to the internal combustion engine, or power recovery. Furthermore, innovative transmission concepts are known, which are operated with multiple clutches. These innovative drive concepts lead to certain operating situations requiring adaptations of the adjustment of an automated clutch.

Consequently, an object of the present invention is to provide a method for adapting the adjustment of a clutch in unconventional drive trains of a vehicle.

The present invention is directed to such a method and indicate approaches such as clutch settings, a gripping or contact point or a coefficient of friction, for example, capable of being adapted according to changes occurring in operation or venting sequences capable of being performed.

BRIEF DESCRIPTION OF THE DRAWINGS

The present invention is elucidated with reference to the schematic drawing as an example, including further details.

FIG. 5 shows a block diagram of a conventional automated drive train of a motor vehicle, including the corresponding control unit, and FIG. 6 shows a known clutch actuating device having a hydraulic link.

DETAILED DESCRIPTION

Figure 1:
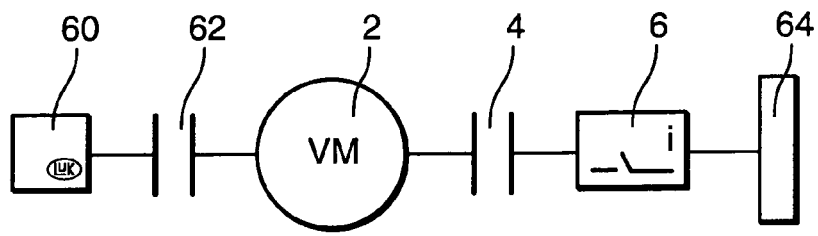
FIGS. 1 through 4 show schematic drawings of unconventional drive trains.

A. Drive Train Having a Start-stop Function

In the unconventional drive trains elucidated below, the individual units such as engine, electric motor/generator (e.g. a hybrid vehicle electric drive motor), clutch, and transmission, are, similarly to the units of FIG. 5, connected to a control unit which controls the operation of the units, or actuating devices or adjusting elements assigned thereto according to predefined programs.

Initially a conventional drive train, which is additionally provided with a start-stop function so to make it unconventional as defined herein, is described with reference to FIG. 1. The drive train has an essentially known starter 60, which is connected to engine 2 via an electromagnetically actuated gear clutch 62. Engine 2 is connected to at least one vehicle wheel 64 via start clutch 4 and a transmission 6. Start clutch 4 and a transmission 6 are automated, transmission 6 being an automated transmission shifting to individual gears, for example. In the following, only start clutch 4 will be discussed, since gear clutch 62 couples starter 60 to engine 2 as essentially known from the related art only at start-up. Basically, all clutch adaptations of start clutch 4 may be performed in the drive train of FIG. 1 as essentially known while engine 2 is running.

The start-stop function incorporated in the drive train of FIG. 1, which basically includes the capability of engine 2 to be automatically shut off when the vehicle is stopped or even when it is coasting, and automatically restarted when needed for accelerative force (for example, when shifting into gear with the vehicle stopped or stepping on the accelerator with the vehicle stopped and in gear) results in the need to modify the conventional adaptation strategy.

A.1 Contact Point Adaptation

Contact point adaptation may be performed in the conventional manner only when engine 2 is idling even while the vehicle is stopped, i.e., no start/stop is performed. This may be the case with the engine in the warm-up phase the engine running to drive an AC compressor the engine running because there is a high demand for electric power and a generator (not shown) must be driven, or the engine running somewhat longer at the request for a contact point adaptation by control unit 14 (FIG. 5), i.e., delay in the automatic engine shut-off.

The warm-up phase of the engine is unfavorable for contact point adaptation, because the engine torque constantly changes during the warm-up phase due to friction and thermodynamic factors.

Contact point adaptation may be performed while the vehicle creeps. If the vehicle creeps at constant velocity (i.e., steady-state equilibrium exists), clutch 4 slips, and the idling regulator of engine 2 is active. The difference of the engine torque with and without load corresponds to the actual clutch torque. Contact adaptation takes place at a somewhat higher torque level than in the standard method.

Contact Point Adaptation During a Rollout Phase:

While the vehicle rolls with engine 2 idling, clutch 4 may be fully disengaged for a brief period, e.g., for two seconds; subsequently the contact torque is set for approximately two seconds and then the clutch is fully reengaged. A peculiarity of this method is that the clutch must reliably slip, which cannot always be ensured and is checkable only using a transmission input sensor. Furthermore, the driver is able to sense the disengagement. During slower driving the clutch should also normally be engaged.

If a torque sensor is provided on the flywheel or on the output shaft, the torques detected during creeping, start, or gear shift may be used for adapting the torque characteristic curve of the clutch during these phases.

Changes in the Transmission Input rpm:

Before engine 2 is shut off while the vehicle is stopped, the transmission is shifted into neutral and clutch 4 is engaged. As soon as clutch 4 slips, the transmission input rpm changes considerably. It is also possible to drive the transmission input shaft to high speed by engaging clutch 4 and then to disengage the clutch and shut off the engine. If the clutch is engaged slowly, the transmission input rpm drops suddenly. If the moment of inertia of the transmission input shaft is known, the actual contact torque acting on the clutch is determinable via the brake acceleration. By comparing the drop in rpm with the clutch disengaged, calibration is also possible. A peculiarity of this procedure is the need for a transmission input rpm sensor. The procedure is also relatively inaccurate.

An advantageous method for determining the zero force point of clutch actuation should additionally be noted. If engine 2 is off and clutch 4 is fully engaged, in the case of a hydraulic link in the clutch actuating device (FIG. 6), the sensor cylinder may be moved into the position to the right from which the slave cylinder exerts a pressure on the disk spring of clutch 4. If the clutch actuator is actuated with a superimposed vibration, this position is accurately settable. Often the distance between the zero force point and contact point is relatively constant, so that the determination of the zero force point may be simultaneously used for determining or updating the contact point.

Coefficient of friction adaptation and venting may be performed in the conventional manner for the drive train according to FIG. 1.

B Motor/generator on the Transmission Input Shaft

Figure 2:
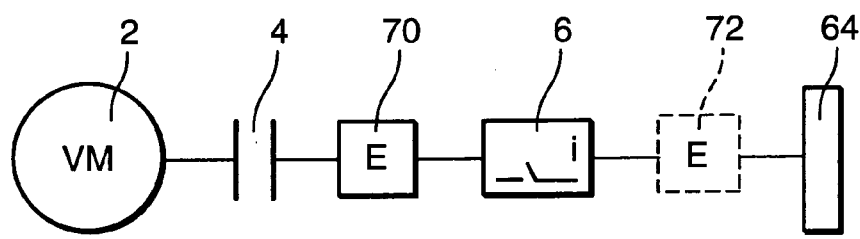

FIG. 2 shows an unconventional drive train in which engine 2 is connected to the input shaft of transmission 6 via a start clutch 4. The rotor of an electric motor/generator 70 is rotatably connected to the input shaft of transmission 6. The output shaft of transmission 6 is optionally rotatably connected to another electric motor/generator 72.

Electric motor/generator 70 (and optionally 72) is controllable by control unit 14 in such a way that the torque developed by it and/or its rotational speed is settable, the electric motors/generators being able to convert mechanical energy into electrical energy which may be supplied to a battery in braking operation. Drive trains according to FIG. 2 are used in hybrid vehicles, for example.

B.1 Contact Point Adaptation

B.1.1 Contact Point Adaptation in the Conventional Manner

Contact point adaptation may be performed in the conventional manner only when engine 2 is idling even while the vehicle is stopped, i.e., no start/stop function is executed. This may be the case as discussed under A.1 above.

B.1.2 Contact Point Adaptation Against the Electric Motor/generator

With transmission 6 in neutral (the vehicle may then be driven by electric motor/generator 72, for example), engine 2 idling, clutch 4 disengaged, and electric motor/generator regulated to a rotational speed (usually 0) that is different from the idling speed of the engine, contact point adaptation may be performed even with the vehicle in motion by briefly engaging clutch 4 and comparing the engine torque. The prerequisite for this adaptation is that engine 2 should be running without being used for driving the vehicle. This may be the case, for example, when engine 2 must drive electric motor/generator 70 to generate electrical power. During contact point adaptation, power generation must then be interrupted for approximately five seconds.

B.1.3 Contact Point Adaptation Against an Engine in Neutral

Engine 2 is off and acts as a brake of the engine-side clutch disk. All contact point adaptations that follow may be performed in sequence with different clutch contact torques. In this way the bottom part of the clutch torque characteristic curve may be measured and adapted step-by-step. The limit of the clutch torque is then the initial breakaway torque of engine 2 which has been shut off.

a) The rpm of electric motor/generator 70 is regulated. Clutch 4 is engaged to the point of contact and the actually applied clutch torque is measured through the increase in the motor/generator torque. Since a comparison is performed between motors/generators under load and without load, even small clutch torques may be accurately measured. The prerequisite for this method is that the torque of motor/generator 70 is known in the control unit.

b) Clutch 4 is initially engaged. Motor/generator 70 applies a small, constant torque of 4 Nm, for example. Clutch 4 is slowly disengaged. At the point where motor/generator 70 starts to rotate, the clutch ceases to transmit the torque set at the motor/generator (less the moment of friction of the transmission input shaft). This method may be performed with different torques, so that again the bottom part of the clutch torque curve is measurable. The method presupposes that the torque of motor/generator 70 may be regulated by the control unit. The transmission input rpm must also be measured.

c) Clutch 4 is engaged to the point of contact with the shafts stopped. The torque of motor/generator 70 is slowly increased from zero until the adhesion of the clutch is broken and motor/generator 70 starts to rotate. The torque of the motor/generator reached to this point (less the friction moment of the transmission input shaft) then corresponds to the actual, effective clutch torque, so that adaptation is possible. This method may be used at each start of the motor/generator; different clutch torques may be measured. The prerequisite again is that the torque of motor/generator be controllable by the control unit. Furthermore, the transmission input shaft rpm or the rpm of the motor/generator must be measured.

In procedures b) and c), the initial breakaway torque of the motor/generator must be known; it may be determined by procedure c) with the clutch disengaged.

d) Clutch 4 is initially disengaged. Motor/generator 70 is rpm regulated and driven using a low maximum limit. The idling torque of the motor/generator is determined. The clutch is slowly engaged. As soon as the rpm of the motor/generator is reduced, the clutch transmits a somewhat higher torque than the maximum torque of the motor/generator less the idling torque. The prerequisite for this method is that the torque of the motor/generator is controllable by the control unit and the transmission input rpm is available.

Clutch 4 is initially disengaged. Motor/generator 70 is brought to a certain rpm and subsequently winds down unpowered. The clutch is set to the contact point. The exact clutch torque may be computed using the brake acceleration of the motor/generator (change in rpm over time) and the known moment of inertia of its rotor.

B.2 Coefficient of Friction Adaptation

Conventional coefficient of friction adaptation: May be performed at start-up or re-engaging.

Coefficient of friction/point of contact adaptation via the combined action of engines and motors/generators:

While driving, the driving/braking torque may be distributed to engine 2 and motor/generator 70. With the clutch slipping, the following applies (all torques and inertias referred to the same axis):

$$M_{clutch} + (M_{m/g} - J_{m/g} \cdot \dot{\omega}_{m/g}) = M_{driver's\ intent} \quad (1)$$

$$M_{clutch} = M_{engine} - J_{VM} \cdot \dot{\omega}_{engine} \quad (2)$$

For an approximately constant engine rpm, the following applies:

$$M_{clutch} = M_{engine} \quad (3)$$

$$\text{or } \Delta M_{clutch} = \Delta M_{engine} \quad (4).$$

where $M_{engine}$, $J_{engine}$, and $\dot{\omega}_{engine}$ are the torque, the moment of inertia, and the rotational acceleration of the engine, respectively, and $M_{m/g}$, $J_{m/g}$, and $\dot{\omega}_{m/g}$ are the corresponding values of the motor/generator.

Thus any desired torque at the clutch may thus be generated during acceleration, normal driving, or in braking/recovery through the combined action of engine and motor/generator. With respect to the clutch, contact point adaptation, start-up, or shifting into gear of a conventional vehicle may thus be simulated independently of the driving situation.

Since in the above-described method high clutch torques may also be set and determined, a complete clutch characteristic curve may be measured, so that the method is well suited for coefficient of friction adaptation.

Of course, the most accurate data is obtained under steady-state conditions, since no dynamic components are present and the signals may be smoothed by averaging.

To determine small clutch torques, differential equation (4) is well suited, since inaccuracies in the engine idling torque are then excluded.

B.3 Venting

Venting is performed:

On starting the engine (the clutch is engaged for this purpose);

During driving using the engine, the clutch being operated with or without torque feedback; venting may be performed every 60 to 180 seconds;

When the engine is off and the motor/generator is stopped (transmission in neutral);

When the vehicle is stopped and a gear has been selected, the engine is off and the motor/generator is stopped.

In contrast with a conventional automated drive train, the clutch must be held disengaged when the engine is stopped, and the transmission must not be in neutral during venting.

C. Double Clutch System

Figure 3:
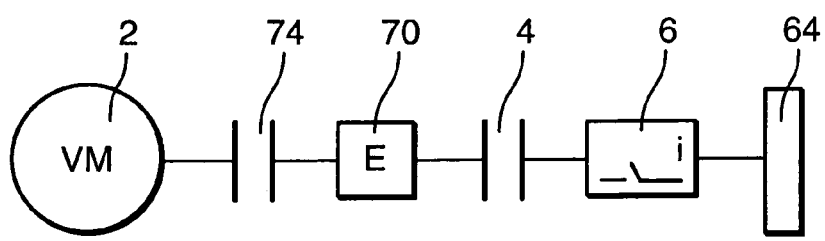

FIG. 3 shows a drive train in which engine 2 is connected to motor/generator 70 via a first clutch 74, and the motor/generator is in turn connected to a vehicle wheel 64 via the actual start clutch 4 and transmission 6. Clutch 74 is normally only used for starting engine 2 and remains engaged as long as engine 2 is running. Clutch 74 is often used in regenerative braking, since the braking power is to be completely recovered in motor/generator 70, rather than being lost in drag resistances of engine 2.

C.1 Contact Point and Coefficient of Friction Adaptation

The combination of clutch 4 with transmission 6 may be considered as the individual transmission of Section B for adaptation of clutch 74. Instead of the prerequisites stated there as "neutral" and "in gear," in the present case the conditions "clutch 4 disengaged and/or neutral gear" and "clutch 4 engaged and in gear," respectively, apply.

For the adaptation of clutch 4, all options explained in Section A apply if clutch 74 is engaged and the torque used for adaptation is formed from the sum of the individual torques of engine 2 and motor/generator 70.

While in Section A only engine 2 was used as the driving element, which, however, is normally shut off for the situation typical to contact point adaptation, in the present case there is the possibility of shutting off engine 2, disengaging clutch 74, and using the motor/generator as the active element for contact point adaptation.

C.2 Venting Clutch 74

When engine 2 is running, clutch 74 is normally fully engaged, so that venting is possible.

If the engine is off, the options of Sections B.3 and C.4 apply.

C.3 Venting Clutch 4

Clutch 4 is operated approximately as a normal start clutch, so that venting may be performed in short time intervals as with a conventional drive train when clutch 74 is engaged for operation (with or without torque feedback during driving).

In neutral gear with motor/generator 70 running for rapid start of engine 2, venting should only be performed in exceptional cases.

C.4 Keeping the Clutch Disengaged

In the case of a hydraulic link according to FIG. 6, it may be difficult to keep the clutch disengaged for a longer period of time. If the temperature rises, the clutch is disengaged further than intended, which may damage the disk spring tabs. If the temperature drops, the clutch slips or engages. Possible situations in which the clutch must be kept disengaged for a longer period of time and the respective adaptation options are elucidated below.

C4.1 Preparation Rapid Start

Motor/generator 70 is kept at a constant rpm. Both clutches are kept disengaged (or, if there is no clutch 4, with transmission in neutral). Since in actual driving it is not known how long the vehicle is stopped at a traffic light, for example, the clutches may have to remain disengaged for several minutes. The following clutch strategy is advantageous for this purpose:

If possible, venting should be performed immediately before motor/generator 70 is up to speed.

To prevent the clutches from disengaging too wide, the contact point of the clutches is checked periodically. The method according to B.1.3 (a) is suitable for this procedure, clutch 74 being braked against engine 2 and start clutch 4 with a gear selected against the vehicle brake. If engine 2 is started up while driving, this is performed without a waiting period after motor/generator 70 has reached its speed.

Since motor/generator 70 runs without load, unintended disengagement of the clutches due to the temperature is recognizable through an increased load on motor/generator 70. This information results in adaptation of the contact point. The clutch that slips may be identified through its wider disengagement.

If clutch 74 engages with excessive force, this may be recognized through an engine rpm during a brief period.

If the path of the sensor cylinder of clutch 74 is exhausted, engine 2 must be started up for performing a venting. Venting of clutch 4 is possible by bringing the transmission to neutral and slowly engaging the clutch.

C.4.2 Longer Driving Using the Electric Motor (Zero Emissions Mode)

Clutch 4 is engaged. The following strategy is followed for clutch 74:

If possible, venting is performed with the vehicle stopped.

Contact point adaptation as in rapid start is not possible, since a variable load is also being applied to the motor/generator by the wheel output.

There is the possibility here to apply a small periodic and/or stochastic clutch torque and to look for the corresponding pattern in the load on the motor/generator (correlation test). A separation between the torque on power take-off side and clutch side is thus achieved, and the clutch contact point may be checked and corrected.

C.4.3 Longer Recovery Phase (e.g., Downhill Travel)

Clutch 4 is engaged. The following strategy is followed for clutch 74:

In principle, the procedure as in longer travel with electric motor only according to Section C.4.2 may be used.

A simpler option is to briefly interrupt recovery and let mechanical braking of the vehicle apply the braking power. The gear is in neutral and the clutch is engaged for venting (the motor/generator is optionally braked previously).

D. Load Shifting Transmission

Figure 4:
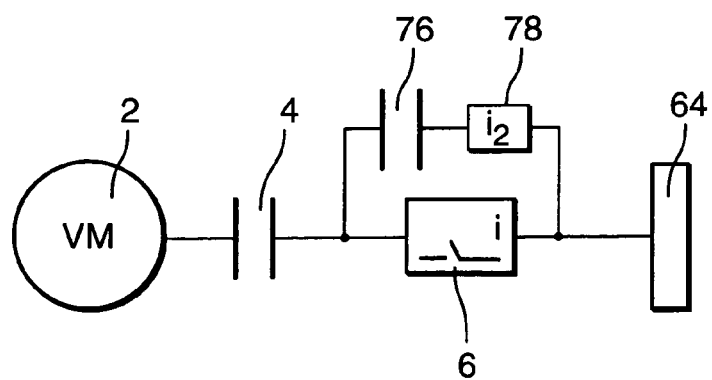

FIG. 4 shows a drive train in which engine 2 is connected to a transmission 6 via the actual start clutch 4, the transmission being connected to a vehicle wheel 64. The input shaft of transmission 6 is rotatably connected to an additional clutch 76, which is connected to the input shaft of a transmission stage 78, whose output shaft is rotatably connected to the output shaft of transmission 6. Additional clutch 76 may then be advantageously provided as a friction device in which both friction surfaces have a conical design and are preferably operated wet. Such a friction device may simultaneously replace the synchro devices of a conventional transmission stage and is activated by the switching motor.

In such an essentially known load shifting transmission (6, 76, 78), clutch 4 is only needed at start; during shifting it is engaged. Load shifting clutch 76 is normally disengaged, and it slips during shifting.

D1. Contact Point and Coefficient of Friction Adaptation; Venting for Clutch 4

If clutch 76 is disengaged, the same adaptation options are available as in Section A. If in-gear operation is required, this may be achieved with the drive train according to FIG. 4 by transmission 6 being in neutral, but load shifting clutch 76 being engaged.

Since clutch 4 remains engaged during shifting, coefficient of friction adaptation may only be performed during the start sequences.

Additional Function:

The vehicle must be braked for contact point adaptation, since the start clutch is slightly engaged during adaptation. To ensure that the vehicle is braked (not only the first notch of the hand brake), load shifting clutch 76 may be engaged, reduction ratio $i_2$ of transmission stage 78 being different from the reduction ratio i set for transmission 6.

Additional "Hill Holder" Function:

When starting (uphill), the vehicle may be initially held by the engaged load shift clutch 76 and $i_2 \neq i$ until start clutch 4 transmits a sufficient torque. Instead of the hand brake, the vehicle is started against load shift clutch 76. When the vehicle is stopped and in gear and the engine running, this brake position may basically always be used.

D2. Contact Point Adaptation for Load Shift Clutch 76

With the gear in neutral and clutch 4 engaged, the same configuration as in Section A is obtained, so that the same strategies described there may be used.

D.3 Coefficient of Friction Adaptation for Load Shift Clutch 76

During shifting, load shift clutch 76 slips and often transmits a high torque. This situation may be used for coefficient of friction adaptation.

D.4 Venting for Load Shift Clutch 76

If the actuating device for load shift clutch 76 contains a hydraulic link, venting may take place in the following situations:

reduction ratio $i=i_2$; load shift clutch 76 permanently engaged;

reduction ratio $i \neq i_2$, vehicle stopped, engine running, start clutch 4 disengaged (breaking function);

reduction ratio $i \neq i_2$, vehicle stopped, engine 2 off;

neutral gear, start clutch disengaged (if necessary, monitor for burst rpm of start clutch 4 if load shift clutch 76 in $1^{st}$ gear).

What is claimed is:

1. A method for adapting an adjustment of a clutch in an unconventional drive train of a vehicle, the drive train having an internal combustion engine provided with a starter, the engine being connected to a transmission via an automated clutch actuated by an actuating device, an output shaft of the transmission driving at least one vehicle wheel, the engine being automatically shut off when the vehicle is stopped and certain predefined operating states prevail, and automatically started when certain predefined operating states prevail, the method comprising:

adapting a contact point of the clutch when the engine is idling with the vehicle stopped.

2. The method as recited in claim 1 wherein the automatic shutoff of the engine is delayed for performing a contact point adaptation.

3. A method for adapting an adjustment of a clutch in an unconventional drive train of a vehicle, the drive train having an internal combustion engine provided with a starter, the engine being connected to a transmission via an automated clutch actuated by an actuating device, an output shaft of the transmission driving at least one vehicle wheel, the engine being automatically shut off when the vehicle is stopped and certain predefined operating states prevail, and automatically started when certain predefined operating states prevail, the method comprising:

adapting a contact point of the clutch with the vehicle creeping at an approximately constant speed, the adapting step including: detecting a first engine torque with the vehicle creeping; disengaging the clutch for a certain time; detecting a second engine torque with the clutch disengaged; and assigning a position of the actuating device with the vehicle creeping to a clutch torque corresponding to a difference between the first and second engine torques.

4. A method for adapting an adjustment of a clutch in an unconventional drive train of a vehicle, the drive train having an internal combustion engine provided with a starter, the engine being connected to a transmission via an automated clutch actuated by an actuating device, an output shaft of the transmission driving at least one vehicle wheel, the engine being automatically shut off when the vehicle is stopped and certain predefined operating states prevail, and automatically started when certain predefined operating states prevail, the method comprising:

adapting a contact point of the clutch is adapted with the vehicle rolling and the engine idling and the clutch being fully disengaged, the adapting step including: detecting engine torque with the clutch fully disengaged; engaging the clutch until an engine torque increases by a predefined contact torque; and storing a corresponding position of the actuating device as the adapted contact point.

5. A method for adapting an adjustment of a clutch in an unconventional drive train of a vehicle, the drive train having an internal combustion engine provided with a starter, the engine being connected to a transmission via an automated clutch actuated by an actuating device, an output shaft of the transmission driving at least one vehicle wheel, the method comprising:

automatically shutting off the engine when the vehicle is stopped and certain predefined operating conditions prevail;

automatically starting the engine when other certain predefined operating conditions prevail; and detecting torque transmitted by the clutch during predefined operating phases and adapting a clutch characteristic curve as a function of the detected torque.

6. A method for adapting an adjustment of a clutch in an unconventional drive train of a vehicle, the drive train having an internal combustion engine provided with a starter, the engine being connected to a transmission via an automated clutch actuated by an actuating device, an output shaft of the transmission driving at least one vehicle wheel, the engine being automatically shut off when the vehicle is stopped and certain predefined operating states prevail, and automatically started when certain predefined operating states prevail, the method comprising:

detecting changes in a rotational speed of the transmission output shaft as a function of the position of the actuating device with the transmission in neutral;

computing a particular clutch torque as a function of the changes in the rotational speed and the moment of inertia of the input shaft; and adapting a clutch characteristic curve as a function of the particular clutch torque.

7. A method for adapting an adjustment of a clutch in an unconventional drive train of a vehicle, the drive train having an internal combustion engine provided with a starter, an engine being connected to a transmission via an automated clutch actuated by an actuating device, the output shaft of the transmission driving at least one vehicle wheel, the method comprising:

automatically shutting off the engine when the vehicle is stopped and certain predefined operating conditions prevail;

automatically starting the engine when other certain predefined operating conditions prevail;

determining a zero force point of the clutch by displacing the actuating device from a non-actuated position of the clutch toward a clutch actuation; and determining a position of the actuating device where a clutch actuation force appears.

8. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:

adapting a contact point of the clutch with the transmission in neutral and the engine idling, the adapting step including: regulating the motor/generator to a rotational speed different from an idling speed of the engine; and engaging the clutch until a torque of the engine changes by a predefined contact torque.

9. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:

adapting a contact point of the clutch with the engine stopped, the adapting step including engaging an initially fully disengaged clutch while the motor/generator is running until a torque of the motor/generator changes by a predefined contact torque.

10. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:

adapting a contact point of the clutch with the engine stopped, the adapting step including: applying electric power the motor/generator when stopped so that the motor/generator generates a predefined contact torque; and disengaging the clutch until the motor/generator begins to rotate.

11. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:

adapting a contact point of the clutch with the engine stopped and the motor/generator stopped, the adapting step including: actuating the clutch so the clutch transmits a predefined setpoint contact torque; applying electric power to the motor/generator until the motor/generator begins to rotate; and storing the developed torque as the actual contact torque.

12. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:
adapting the contact point of the clutch with the engine stopped, the adapting step including: disengaging the clutch is disengaged; operating the motor/generator with a low predefined maximum torque limitation and regulated rotational speed; determining an idling torque of the motor/generator; engaging the clutch until a speed of the motor/generator drops; and assigning the limited maximum torque less the idling torque to a position of the clutch.

13. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising the steps of:
adapting a contact point of the clutch with the engine stopped, the adapting step including: disengaging the clutch; bringing the motor/generator to a certain rotational speed and subsequently running the motor/generator without power; bringing the clutch to a predefined contact position; detecting a change in the rotational speed of the motor/generator; and computing an actual contact torque of the clutch as a function of a moment of inertia of the motor/generator and a change in the rotational speed.

14. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:
performing a coefficient of friction adaptation of the clutch, the performing step including generating a predefined torque at the clutch by activating the engine and the motor/generator, and actuating the clutch so that the clutch begins to slip at the predefined torque.

15. A method for adapting an adjustment of a clutch in an unconventional drive train of a vehicle, the drive train having an internal combustion engine connected to a transmission via an automated clutch actuated by an actuating device, an output shaft of the transmission driving at least one vehicle wheel, an input shaft of the transmission being rotatably connected to a rotor of an electric motor/generator, the method comprising:
carrying out a venting sequence when: the engine is started with the clutch engaged; or the vehicle is operated with engine propulsion and engaged clutch; or when the engine is shut down, the motor/generator is stopped, and the transmission is in neutral; or the vehicle is stopped, a gear is selected, the engine is shut down, and the motor/generator is stopped.

16. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:
activating the engine, the motor/generator, and the second clutch for coefficient of friction adaptation of the first clutch so that a predefined torque is generated on the first clutch, and
actuating the first clutch so that the first clutch is at a slip limit.

17. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:
activating the engine, the motor/generator and the first clutch for coefficient of friction adaptation of the second clutch so that a predefined torque is generated on the second clutch; and
actuating the second clutch so that the second clutch is at a slip limit.

18. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:
venting the first clutch during at least one of the following operating conditions: the engine running; the engine stopped, the motor/generator stopped and the transmission in neutral; and the vehicle stopped, a gear selected, the engine stopped and the motor/generator stopped.

19. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:
venting the second clutch with the engine running and the second clutch engaged.

20. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:

venting the first clutch before the motor/generator reaches a speed to start the engine.

21. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:

performing a contact point adaptation of the first clutch by braking the first clutch against the engine, or performing a contact point adaptation of the second clutch by braking the second clutch against a vehicle brake with a gear selected.

22. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:

performing a contact point adaptation of the first clutch in a drive condition with motor/generator propulsion by periodically actuating the first clutch in a direction of engagement using a small amplitude and detecting a resultant load fluctuation of the motor/generator.

23. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:

performing a contact point adaptation of the first clutch in a drive condition with the vehicle being driven by the motor/generator or in a drive condition with the motor/generator being driven by the vehicle by periodically actuating the first clutch in a direction of engagement using a small amplitude and detecting a resultant load fluctuation of the motor/generator.

24. A method for adapting an adjustment of a clutch in an unconventional drive train of a vehicle, the drive train having an internal combustion engine connected to an electric motor/generator via a first automated clutch actuated by a first actuating device, the motor/generator being connected to an input shaft of a transmission via a second automated clutch actuated by a second actuating device, an output shaft of the transmission driving at least one vehicle wheel, the method comprising:

venting the first clutch in a drive condition with the vehicle being driven by the motor/generator, the vehicle being braked using brakes, the transmission being put into neutral, and the first clutch being engaged for the venting.

25. A method for adapting an adjustment of a clutch in an unconventional drive train of a vehicle, the drive train having an internal combustion engine connected to an input shaft of a transmission via an automated start clutch actuated by an actuating device, an output shaft of the transmission driving at least one vehicle wheel, an input shaft being connected to the output shaft via an automated load shift clutch and a transmission stage, the method comprising:

adapting a coefficient of friction of the start clutch during a start sequence.

26. A method for adapting an adjustment of a clutch in an unconventional drive train of a vehicle, the drive train having an internal combustion engine connected to an input shaft of a transmission via an automated start clutch actuated by an actuating device, an output shaft of the transmission driving at least one vehicle wheel, an input shaft being connected to the output shaft via an automated load shift clutch and a transmission stage, the method comprising:

engaging the load shift clutch during a contact point adaptation of the start clutch.

27. A method for adapting an adjustment of a clutch in an unconventional drive train of a vehicle, the drive train having an internal combustion engine connected to an input shaft of a transmission via an automated start clutch actuated by an actuating device, an output shaft of the transmission driving at least one vehicle wheel, an input shaft being connected to the output shaft via an automated load shift clutch and a transmission stage, the method comprising:

shifting the transmission during a contact point adaptation of the load shift clutch into neutral and engaging the start clutch.

28. A method for adapting an adjustment of a clutch in an unconventional drive train of a vehicle, the drive train having an internal combustion engine connected to the input shaft of a transmission via an automated start clutch actuated by an actuating device, an output shaft of the transmission driving at least one vehicle wheel, the input shaft being connected to the output shaft via an automated load shift clutch and a transmission stage, the method comprising:

performing a contact point adaptation of the load shift clutch during shifting.

29. A method for adapting an adjustment of a clutch in an unconventional drive train of a vehicle, the drive train having an internal combustion engine connected to the input shaft of a transmission via an automated start clutch actuated by an actuating device, an output shaft of the transmission driving at least one vehicle wheel, the input shaft being connected to the output shaft via an automated load shift clutch and a transmission stage, the method comprising:

venting the load shift clutch when: a reduction ratio of the transmission is equal to that of the transmission stage and the load shift clutch is engaged; or the reduction ratio of the transmission is not equal to that of the transmission stage, the vehicle is stopped, the engine is running, and the start clutch is disengaged; or the reduction ratio of the transmission is not equal to that of the transmission stage, the vehicle is stopped, and the engine is shut down; or the transmission is in neutral and the start clutch is disengaged.

30. A method for operating a vehicle having an unconventional drive train, the drive train having an internal combustion engine connected to an input shaft of a transmission via an automated start clutch actuated by an actuating device, an output shaft of the transmission driving at least one vehicle wheel, the input shaft being connected to the output shaft via an automated load shift clutch and a transmission stage, the method comprising:

engaging the load shift clutch with the start clutch disengaged, the engine running, the vehicle stopped, and a reduction ratio of the transmission not being equal to that of the transmission stage; and gradually disengaging the load shift clutch for start while the start clutch is engaging.

* * * * *

UNITED STATES PATENT AND TRADEMARK OFFICE
CERTIFICATE OF CORRECTION

PATENT NO. : 6,966,868 B2  Page 1 of 1
DATED : November 22, 2005
INVENTOR(S) : Holger Stork et al.

It is certified that error appears in the above-identified patent and that said Letters Patent is hereby corrected as shown below:

<u>Title page,</u>
Item [75], Inventors, "Kengeberg, NL" should be replaced with -- Kongsberg, Norway --; and "Thalmassing, Germany" should be replaced with -- Woerth A. D. Donau, Germany --.

<u>Column 13,</u>
Line 36, "runring" should be replaced with -- running --.

Signed and Sealed this

Fourth Day of April, 2006

JON W. DUDAS
*Director of the United States Patent and Trademark Office*